US011870549B2

(12) United States Patent
Marti

(10) Patent No.: US 11,870,549 B2
(45) **Date of Patent: *Jan. 9, 2024**

(54) SYSTEM AND METHOD FOR SELECTING INPUT FEEDS TO A MEDIA PLAYER

(71) Applicant: InterDigital CE Patent Holdings, SAS, Issy-les-Moulineaux (FR)

(72) Inventor: Urs-Viktor Marti, Münchenbuchsee (CH)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,319

(22) Filed: May 18, 2020

(65) Prior Publication Data

US 2020/0382229 A1 Dec. 3, 2020

Related U.S. Application Data

(63) Continuation of application No. 15/492,586, filed on Apr. 20, 2017, now Pat. No. 10,659,182, which is a (Continued)

(30) Foreign Application Priority Data

Apr. 30, 2013 (EP) .................................... 13165971

(51) Int. Cl.
*H04H 40/18* (2008.01)
*H04H 60/13* (2008.01)
(Continued)

(52) U.S. Cl.
CPC ............ *H04H 40/18* (2013.01); *H04H 20/08* (2013.01); *H04H 60/13* (2013.01); *H04H 20/82* (2013.01); *H04H 2201/90* (2013.01)

(58) Field of Classification Search
CPC ........ H04H 40/18; H04H 20/08; H04H 60/13; H04H 20/82; H04H 2201/90
See application file for complete search history.

(56) References Cited

U.S. PATENT DOCUMENTS

| | | | | |
|---|---|---|---|---|
| 7,110,720 B1 * | 9/2006 | Henderson ............. | H04H 20/71 455/39 |
| 2002/0152388 A1 | 10/2002 | Linnartz et al. | |

(Continued)

FOREIGN PATENT DOCUMENTS

| | | |
|---|---|---|
| CN | 101595665 A | 12/2009 |
| CN | 102549933 A | 7/2012 |

(Continued)

OTHER PUBLICATIONS

European Search Report for EP13165971, dated Jun. 21, 2013, 2 pages.

*Primary Examiner* — Yuwen Pan
*Assistant Examiner* — Fatuma G Sherif
(74) *Attorney, Agent, or Firm* — Chris Kolefas

(57) ABSTRACT

System and methods are provided for managing use of media feeds in a media player. A media feed may be selected from a plurality of media feeds based on a feedback signal corresponding to an audio output signal of a media player, and a corresponding transmit signal may be configured for transmittal to the media player. The transmit signal may include a plurality of channels, and configuring the transmit signal may include selecting one channel from the plurality of channels based on the feedback signal, and conveying the media feed over the selected channel. The selected channel may be processed to carry the media feed, such as by frequency-modulating the media feed into the selected channel. The feedback signal may be processed, and control information may be determined based on the processing for (Continued)

controlling one or both of the selecting of the media feed and configuring of the transmit signal.

18 Claims, 5 Drawing Sheets

Related U.S. Application Data continuation of application No. 14/266,020, filed on Apr. 30, 2014, now Pat. No. 9,634,779.

(51) Int. Cl.
*H04H 20/08* (2008.01)
*H04H 20/82* (2008.01)

(56) References Cited

U.S. PATENT DOCUMENTS

| | | | | |
|---|---|---|---|---|
| 2004/0204158 | A1 | 10/2004 | Wang et al. | |
| 2007/0142010 | A1 | 6/2007 | Christopher | |
| 2008/0052751 | A1 | 2/2008 | Cromarty et al. | |
| 2008/0130686 | A1 | 6/2008 | Milbar | |
| 2008/0162435 | A1 | 7/2008 | Dooms et al. | |
| 2009/0083116 | A1 | 3/2009 | Svendsen | |
| 2009/0147966 | A1 | 6/2009 | McIntosh et al. | |
| 2010/0010648 | A1* | 1/2010 | Bull | G06F 3/04842 700/94 |
| 2011/0264455 | A1 | 10/2011 | Nelson et al. | |
| 2012/0192236 | A1* | 7/2012 | Cucala | H04H 20/02 725/62 |

FOREIGN PATENT DOCUMENTS

| | | | | |
|---|---|---|---|---|
| JP | 2003514436 A | | 4/2003 | |
| JP | 2004512573 A | | 4/2004 | |
| JP | 2008533766 A | | 8/2008 | |
| JP | 2011232754 A | | 11/2011 | |
| WO | 0135558 | | 5/2001 | |
| WO | WO 0135558 A1 | | 5/2001 | |
| WO | WO 2001035558 A1 | * | 5/2001 | H04H 20/82 |
| WO | WO 2011014867 A1 | | 2/2011 | |

* cited by examiner

SYSTEM AND METHOD FOR SELECTING INPUT FEEDS TO A MEDIA PLAYER

CLAIM OF PRIORITY

This patent application is a continuation of U.S. patent application Ser. No. 15/492,586, filed Apr. 20, 2017, which is a continuation of U.S. patent application Ser. No. 14/266,020, filed Apr. 30, 2014, which in turn claims right of priority to and the filing date benefit of European (EP) Patent Application Serial No. 13165971.6, filed Apr. 30, 2013. Each of the above stated applications is hereby incorporated herein by reference in its entirety.

FIELD

The present disclosure relates to electronic devices and media inputs. More specifically, certain embodiments of the disclosure relate to systems and methods for selecting media input feeds or channels for playback using media players. In particular, but not exclusively, the disclosure relates to a system and method of using the conventional input or channel selection controls of a regular media player, such as a radio receiver, for selecting between various external feeds or channels.

BACKGROUND

The recent shift from analog FM radio to DAB/DAB+, cable, satellite and streamed internet radio (IP-radio) means that listeners invest in different devices for different types of audio transmissions. Attempts have been made to produce devices which are capable of receiving audio content from different types of transmission sources; however, these devices essentially simply combine two or more standard devices into one.

Users who have invested in expensive media playing equipment such as a high quality FM tuner and amplifier are naturally reluctant to move to a new and unfamiliar system in order to receive the same or similar content via internet, cable, the internet, or using a satellite receiver, for example.

The traditional FM (or AM) receiver is simple to use. Decades of development have ensured that channel selection is an intuitively simple operation, suitable for use by even the least technically-minded radio listener. The user can tune the device to the frequency of a desired radio station by, for example, rotating a knob or pressing "up" or "down" buttons until the desired station frequency is reached. Alternatively, frequencies can be programmed and selected by pressing one of a number of preset-station buttons. Such a radio receiver may also have a display for indicating the frequency to which the radio is currently tuned. The display helps the user to find the desired station quickly. It may be a digital numerical display, for example, or a linear scale with a cursor which is moved along the scale. Because radio receivers have undergone a century of development by many manufacturers in many countries, the technology has become largely standardized, and the functionality of devices, the broadcast frequency ranges and the terminology vary little from manufacturer to manufacturer, or from country to country, so that most users are familiar with the technology and are able to operate different devices without difficulty.

By contrast, the reception of digital audio via cable, satellite or internet, for example, requires the use of new and varied devices, each with a different way of selecting channel(s) to which a user may listen. Devices which are available for receiving internet audio streams, for example, may be more complicated and less intuitive to operate than a traditional radio receiver, partly because of the difficulty of managing the vast numbers of channels available on the internet, and partly because the technology is still relatively young and the various approaches have not yet been standardized. Reference must usually be made to a server which provides an index of available internet radio stations, together with connection information (IP address, etc.) and some information about each station. User interfaces for managing the configuration and station-selection operations can also be complex.

Digital radio stations are often available bundled with digital television channels, via cable, satellite or over the internet. In order to listen to such radio stations, the digital TV receiving device such as a "set-top box" must be switched on. In some cases, the television must also be on. This is very inconvenient for the user. Further, while is often possible to connect the set top box to a high fidelity (hi-fi) system, either with cables or wirelessly, this still may not solve the problems of poor usability and increased complexity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

A system and/or method is provided for system and method for selecting input feeds to a media player, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which.

DETAILED DESCRIPTION

Figure 1:
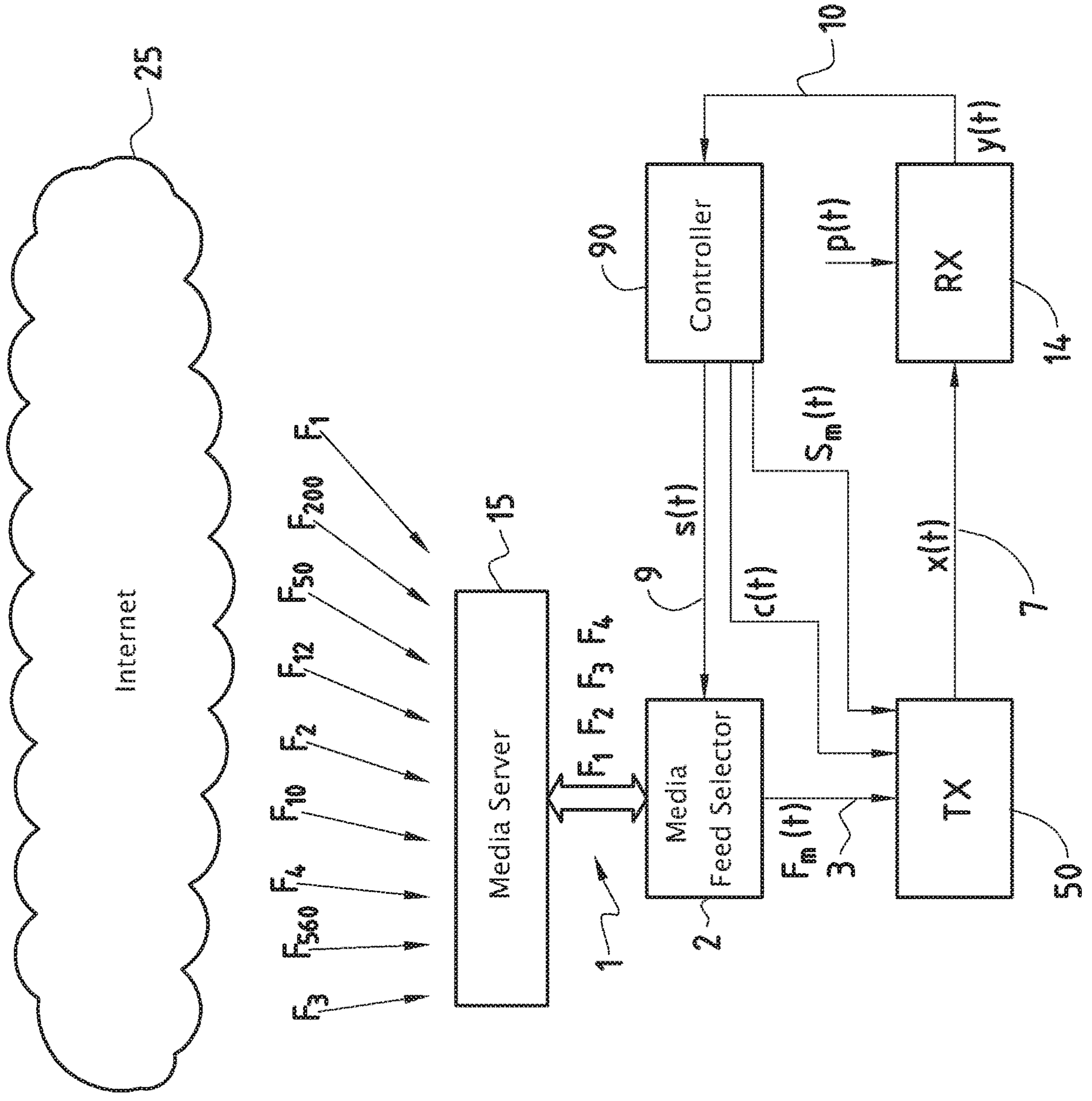
FIG. 1 illustrates an example embodiment of a system according to the disclosure.

As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Certain embodiments of the present disclosure may be found in a method and system for selecting input feeds to a media player, as described below in more detail with reference to the attached figures.

For example, streamed audio from the Internet (or a local area network) may be received by a suitable device (e.g., IP-audio stream receiver) and may then be rebroadcast to a radio tuner via a suitable FM (or AM) transmitter (or similar) on an FM radio frequency, for example. In order to receive a variety of IP audio streams at the FM radio receiver in this way, however, such an arrangement may need to include some means of selecting the IP audio content which is to be broadcast to the FM receiver. Alternatively, multiple IP audio streams could be set up, with each audio stream being then rebroadcast on its own frequency by a suitable transmitter. The radio receiver could then be used to select the radio channel by tuning to the particular frequency of the channel. This potential solution may use a great deal of network bandwidth (and/or greatly reduce the audio quality). The number of channels would thus be limited by the available bandwidth and/or the desired audio quality, particularly with IP-audio. With satellite and cable systems, the audio content is usually being broadcast anyway, at a certain audio quality, so the bandwidth problem is less critical in this case.

In another example, systems and/or methods are provided whereby a media feed may be selected from a plurality of media feeds, based on a received signature signal; the selected media feed may be transmitted to a media player over a first channel; and one or more signature signals may also be transmitted to the media player, over one or more other channels. The received signature signal may be determined based on a feedback signal corresponding to an output signal of the media player.

An advantage of the example is that it permits the advantages of IP radio (for example) to be combined with the advantages of existing analog or digital tuners or other conventional media players. For example, an FM-tuner, be it a high-end hi-fi tuner or an old style radio, may be used, and the usability may be kept simple, while the variety of available radio stations can be increased significantly. Furthermore, it is possible to limit the amount of traffic in the access network, for example using only one radio stream at the time, while providing access to multiple streams.

The following disclosure is directed to two example embodiments: one of a system for selecting between multiple Internet (IP) audio streams on a conventional radio tuner, and one for selecting between multiple playlists on a local media server. It should be understood, however, that disclosure supports playing of media content from any of a plurality of sources, such as audio channels delivered via other communications media such as cable or satellite, and/or on a standard media player equipped with controls for selecting between multiple input feeds or channels.

FIG. 1 illustrates in schematic form a first example embodiment of a system according to the disclosure. Referring to FIG. 1, there is shown a system 1 for selecting and/or configuring input feeds to a media player, in accordance with an example embodiment of the disclosure.

The system 1 may comprise a media feed selector 2, a receiver 14, a transmitter 50, and a controller 90. Each of the media feed selector 2, the receiver 14, the transmitter 50, and the controller 90 may comprise suitable circuitry for implementing various aspects of the present disclosure, including, at least, functions and/or operations attributed thereto with respect to some of the example implementations described with reference to FIG. 1 and/or the following figures. Further, it should be understood that the functional blocks illustrated in FIG. 1 may be separate devices or functional units, or may be combined in one or more devices or functional units.

The receiver 14 may be operable to receive and play (or otherwise handle) a signal that may be configured for use by legacy media receiving devices. The receiver 14 may be, for example, a media player. Accordingly, the terms receiver and media player may be used interchangeably in this disclosure. The receiver 14 may comprise a traditional FM (or AM) tuner, for example, or other standard media player.

The media feed selector 2 may be operable to select an output signal $F_m(t)$ from a set of one or more input signals $\{F_i(t)\}$, where the 't' as used herein may denote time. In this regard, the media feed selector 2 may select the output signal $F_m(t)$ based on, for example, a control signal s(t). The media feed selector 2 may comprise, e.g., a "set-top box" (STB) for a TV, an IP-radio device, a satellite receiver, a computer or mobile device configured to access a media server or to select between two or more playlists of a second local media player, or it may comprise any combination of such media sources (or their functionality).

The set of input signals $\{F_i(t)\}=F_1(t), F_2(t), F_3(t), F_4(t)$ illustrated in FIG. 1 may correspond to, for example, media feeds such as audio, video, or other content. The feeds $F_1$, $F_2$, $F_3$, $F_4$ (time notation t omitted for convenience) may, as illustrated in FIG. 1, already be selected from a larger number of media feeds (e.g., media feeds $F_3$, $F_{560}$, $F_4$, $F_{10}$, $F_2$, $F_{12}$, $F_{50}$, $F_{200}$, and $F_1$), which may be IP streams available on the Internet 25, for example. The media feeds $F_3$, $F_{560}$, $F_4$, $F_{10}$, $F_2$, $F_{12}$, $F_{50}$, $F_{200}$, and $F_1$ may be provided via a media server 15, with the feeds $F_1$, $F_2$, $F_3$, $F_4$ being obtained therefrom by the media feed selector 2.

The transmitter 50 may be operable to receive a media input signal (e.g., the signal $F_m(t)$) from the media feed selector 2, and may generate a corresponding signal x(t) for transmission, such as to the receiver 14 (e.g., via a transmission link 7). In this regard, the transmission link 7 between the transmitter 50 and the receiver 14 may be a wireless radio link, but it may also be a wired or optical connection, for example. The transmitter 50 may be operable to generate the signal x(t) according to Equation 1:

$$x(t) = [F_m(t) + S_m(t)]_{Cm} + \sum_{\varepsilon=1,\varepsilon\neq m}^{K} [S_\varepsilon(t)]_{C\varepsilon} \quad \text{(Equation 1)}$$

The signal x(t) generated by the transmitter 50 may be configured such that it may be suitable for transmission to the receiver 14. Further, the signal x(t) is generated based on the selected media feed $F_m(t)$, a signature signal $S_m(t)$, and a channel $C_m$. The signature signal $S_m(t)$ and the channel $C_m$ may be supplied to the transmitter 50, such as by the controller 90.

A channel signal c(t) may comprise one or more channel information signals $C_n$. The channel $C_m$ may comprise information and/or data associated with a particular transmission channel of the transmitter 50. For example, the transmitter 50 may be an FM radio transmitter. Nonetheless, it should be understood that any standardized or non-standardized transmission method(s) or protocol(s) could be selected. Thus, in the case of an FM radio transmitter 50, $C_m$ may denote an FM radio frequency or frequency band which defines a transmission channel m.

Correspondingly, for other types of multiple access channels or transmission protocols, $C_m$ may denote any information necessary to define a transmission channel, such as a frequency and/or time slot, for example, or an encoding scheme or one of a plurality of wired connections. The operation $[x]_{Cm}$ in Equation 1 above indicates that the signal inside the bracket is carried on a channel $C_m$. For example, if $C_m$ describes an FM radio channel, the operation $[x]_{Cm}$ may indicate that a signal x is frequency-modulated onto an FM radio frequency corresponding to a frequency as defined by $C_m$.

Associated with every channel $C_m$ may be a signature signal $S_m(t)$ and a media feed $F_m(t)$, such that a set of triplets $\{F_i(t),S_i(t),C_i\}$ is formed. There may be a one to one mapping between any one channel $C_m$ and an associated signature $S_m(t)$. In other words, a signature is associated with one channel at a time, and vice versa. Further, the set of signatures $\{S_i(t)\}$ may be generated such that each signature can be uniquely identified by defining features. Hence, the transmitter 50 may generate a sum of K signals, as shown in Equation 1. Of these K signals, one may comprise a media feed $F_m(t)$ and signature $S_m(t)$ being transmitted over a channel $C_m$, and the remaining K−1 signals may each comprise a signature signal $S_i(t)$ over associated channel $C_i$ but without an associated media feed. Nonetheless, in some instances the set of K signals may include more than one which comprises a media feed, as will be described with reference to the other example embodiments. The channel identifiers c(t) and the signature signals S(t) may be the same, in which case the media feed selector and the transmitter would both be adapted to respectively select the media feed or select the transmission channel in response to the same signal.

The receiver 14 may be configured to receive an input signal x(t), which may include a noise component (not shown), and to generate an output signal y(t) intended for human perception. For example, the receiver 14 may be configured to receive data and information from a particular channel $C_m$ to which it is tuned. Further, the receiver 14 may be configured to generate the output signal y(t) according to Equation 2:

$$y(t)=F_\varepsilon(t)+S_\varepsilon(t)+z(t)|p(t)=C_\varepsilon,\ \varepsilon=m$$

$$\text{or } =S_\varepsilon(t)+z(t)|p(t)=C_\varepsilon,\ \varepsilon\neq m \qquad \text{(Equation 2)}$$

The controller 90 may be configured to receive a signal—e.g., the signal y(t) generated by the receiver 14, such as according to Equation 2—which may include a noise component (not shown), and to identify a signature signal $S_m(t)$ in the received signal. In other words, the controller 90 may be configured to recognize a signature signal comprised in an input signal (e.g., the signal y(t)), subject to a suitable signal to noise ratio or other measure of detection quality, for example. The signal y(t) may be communicated as feedback 10 from the receiver 14 to controller 90. The feedback 10 may be communicated via a transmission channel which may be appropriate to the type of media received (or outputted) at the receiver 14. For example, when the receiver 14 is an FM radio receiver, the signal y(t) may be output at the receiver 14 via a loudspeaker, and picked up at the controller 90 by a microphone, for example. Nonetheless, it should be understood that the feedback 10 may be provided by the receiver 14 to the controller 90 via wired, wireless, and/or in any form of connection appropriate to the type of media output by receiver 14.

Based on the signature signal $S_m(t)$ received (and identified) in the output signal y(t) from the receiver 14, the controller 90 may output the signature signal $S_m(t)$ and the associated channel $C_m$ (comprised in c(t)) to the transmitter 50, as illustrated in FIG. 1. Moreover, based on the identified signature signal $S_m(t)$ received in the output signal y(t) from the receiver 14, the controller 90 may adjust (e.g., via communication link 9) the control signal s(t) for the media feed selector 2 such that the media feed selector 2 may select the signal $F_m(t)$ associated with the identified signature signal $S_m(t)$.

Hence, when the receiver 14 is tuned to a different channel (e.g., $C_s$, via control input p(t)), the output signal y(t) of the receiver 14 then will comprise the signature signal $S_s(t)$ associated with channel $C_s$. Correspondingly, the controller 90 will identify that a different signature signal $S_s(t)\neq S_m(t)$ is received, and adjust the multiplexer control signal s(t) such that the media feed $F_s(t)$ associated with $S_s(t)$ will be output to the transmitter 50. Also, the channel signal c(t) will be adjusted so that the media feed $F_s(t)$ and the signature signal $S_s(t)$ will be transmitted over the channel $C_s$, analog to what is illustrated in Equation 1 for the triplet $\{F_m(t), S_m(t), C_m\}$.

In accordance with various example embodiments of the disclosure, for a selected media feed $F_m(t)$, it may be sufficient that $S_m(t)$ has a null value. In such implementations, the controller 90 may interpret the absence of a signature signal ($S_m(t)=0$) in the received signal as indicating that a change of the selected media feed $F_m(t)$ is not desired; and receiving of a signature signal, or receiving of a non-zero signature signal, would indicate that a change of media feed is desired.

When, as illustrated in Equation 1, a signature signal $S_m(t)$ is present, the signature signal $S_m(t)$ may be used to automatically adjust the tuning at the transmitter 50 and/or the receiver 14, such as to optimize some transmission performance or quality criteria (e.g., signal-to-noise ratio). Thus, in such an embodiment, the signature signal may also function as a pilot signal or training signal for the receiver 14.

Because the original media feed signal $F_m(t)$ is available to the transmitter 50, the system may be configured so that the transmitter 50 may also receive the output signal from the receiver 14, and can thus compare the original media feed signal $F_m(t)$ with the output signal y(t), thereby determining how similar the output signal y(t) is to the originally transmitted media feed signal $F_m(t)$. By adjusting the transmission frequency (in the case where the channels are defined as transmission frequencies) by a small amount, and then detecting the resulting change in the measured similarity between the original media feed signal $F_m(t)$ and the output signal y(t), the transmitter may fine-tune the channel characteristics (e.g., frequency) until the greatest similarity is achieved.

In the above description, which refers to the generalized schematic of FIG. 1, an audio feed is used for illustration purposes. However, it should be understood that other forms of media, such as video, may be used, and that the radio receiving device mentioned in the example can be any kind of media player which comprises radio frequency selection controls, such as a radio or television. In the case of a television, the standard channel-selection controls can be used to select between different media sources, for example, in a similar way to that described for a standard FM radio receiver.

In a simple implementation, as shown in FIG. 1 for example, the media feed selector 2 may be configured to receive a single selected one of audio feeds (e.g., $F_1$, $F_2$, $F_3$ and $F_4$). In this regard, the particular single one of the audio feeds may be selected for reception by the media feed selector 2 based on a signature signal identified in the feedback 10 provided by the media player 14. In more complex implementations, however, two or more media feeds (e.g., $F_1$, $F_2$, etc.) may be selected, as explained in more details below.

Figure 2:
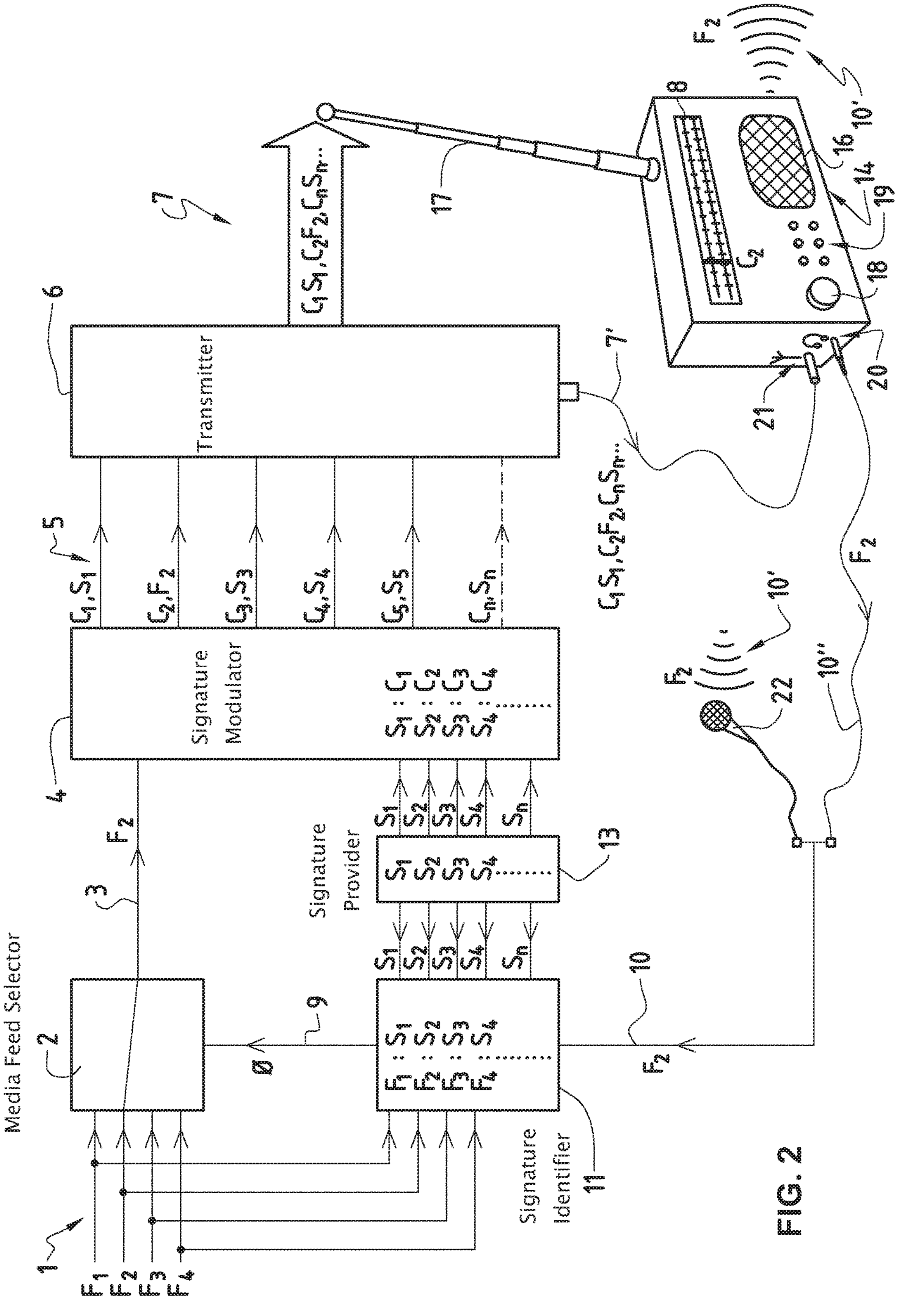
FIGS. 2 to 4 illustrate schematic views of a signal flow such as might be present in a first example embodiment of a system according to the disclosure.
Figure 3:
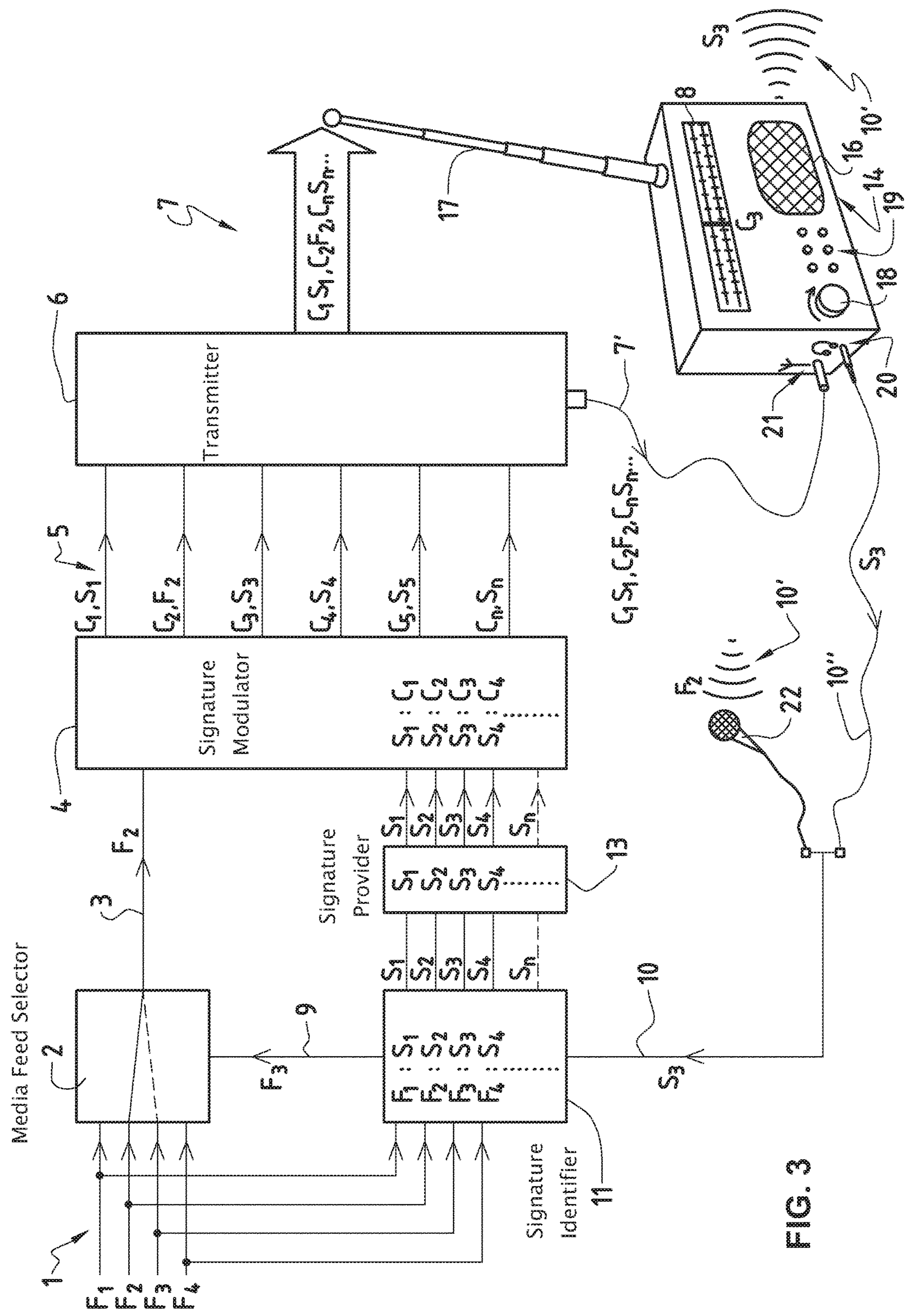
Figure 4:
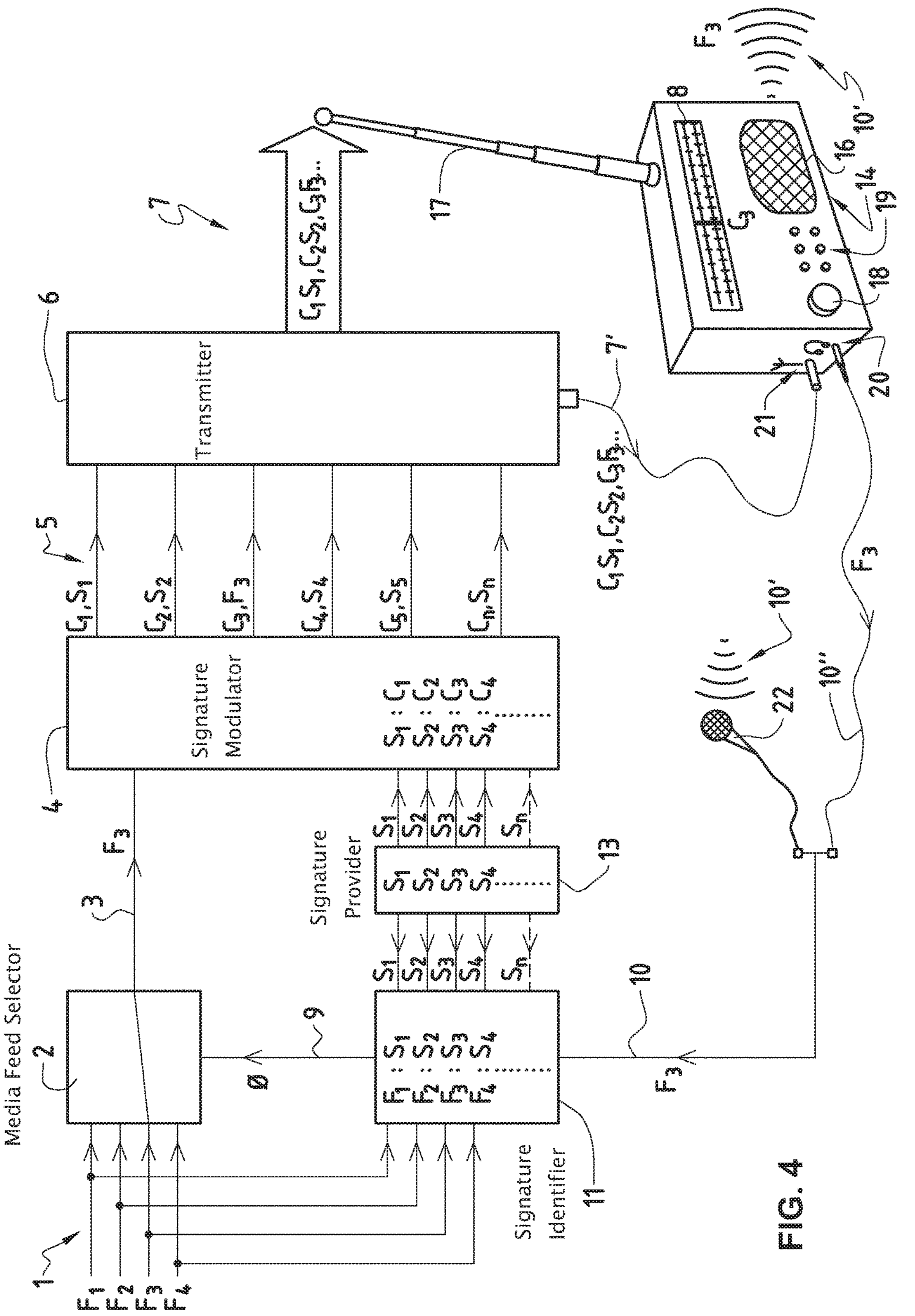

FIGS. 2 to 4 illustrate schematic views of a signal flow such as might be present in the first example embodiment of a system according to the disclosure. In particular, FIGS. 2 to 4 illustrate an example sequence of system states, corresponding to an example embodiment of a system according to the invention (corresponding, e.g., to system 1 of FIG. 1).

As depicted in FIGS. 2 to 4, the receiver (media player) 14 may be, for example, a conventional FM radio (comprising an FM radio tuner or the like). Thus, in accordance with the embodiment described with respect to FIGS. 2 to 4, the media player (radio tuner) 14 may be any kind of radio frequency receiving device with a frequency or channel selection function. Examples of such radio frequency receiving device may comprise a standard kitchen-type FM radio, a hi-fi radio tuner, or a car radio. For example, as illustrated in FIGS. 2 to 4, the media player (radio tuner) 14 may have a control knob 18 and/or selector buttons 19 (for allowing frequency or channel selection) and a tuning display 8 (for display frequency or channel selection). Further, the media player (radio tuner) 14 may comprise aerial (or antenna) 17 for enabling wireless reception, and/or a wired input connector (e.g., a coax input socket) 21, for enabling wired reception (e.g., via cable).

Further, in the example embodiment depicted in FIGS. 2 to 4, the functionality of the controller 90 of FIG. 1 may be implemented in a signature identifier 11 and a signature provider 13; and the functionality of the transmitter 50 of FIG. 1 may be comprised in a signature modulator 4 and a transmitter 6. Each of the signature identifier 11, the signature provider 13, the signature modulator 4, and the transmitter 6 may comprise suitable circuitry for implementing various aspects of the present invention, including the functions and/or operations attributed thereto with respect to the present embodiment.

The sequence of three state systems shown in FIGS. 2 to 4 describes examples of how the receiver (media player) 14 (the FM radio tuner) may switch from receiving a first media feed (e.g., IP stream $F_2$) to receiving a second, different media feed (e.g., IP stream $F_3$). The switching may be in response to a frequency control knob 18 and/or selector buttons 19 of the media player (radio tuner) 14 being operated.

As shown in FIG. 2, audio stream $F_2$ may be selected for reception from input media feeds $F_1$ to $F_4$. In the case of selecting an IP media stream, for example, this may be achieved by transmitting a stream request (e.g., to the URL, IP address, port and/or path of one or more servers hosting the $F_2$ audio stream).

Once selected for reception and thus received by the media feed selector 2 (e.g., after being configured to do so), the active audio stream $F_2$ may be provided via communications links (or outputs) 3, 5 and 7 to the media player 14 (the FM radio). As noted before, the term media player used in connection with the various example embodiments is intended to refer to implementations of the receiver 14 described in reference to the general description relating to FIG. 1. The input signal to the media player 14 may be adapted to convey not only the selected audio feed $F_2$, but also one or more signature signals $S_1$, $S_2$, etc. which may indicate to the media feed selector 2, by means of a change in the audio output of (and/or the feedback provided by) the media player 14, a selection condition or instruction to the media feed selector 2, to change its media feed selection status (e.g., to change from playing media feed $F_2$ to playing media feed $F_3$).

The signature signals $S_1$, $S_2$, etc. may be provided (e.g., recalled from memory or generated) by signature provider 13, and incorporated into (or combined with) the input signal of the media player 14, such as by the signature modulator 4. Further, transmission of the modulated output signal of transmitter 6 via communication link 7, 7') may be achieved by any means of communication, such as wireless or wired communication, which the media player (e.g., radio receiver) 14 may be equipped to receive.

As shown in FIG. 2, the media feed selector 2 may be configured to receive a selected one of at least two (four are shown) media feeds $F_1$ to $F_4$. For example, media feed $F_2$ may be selected when the system is in the state shown in FIG. 2, and the output of the media feed selector 2 (provided via communications link 3), carrying the media content of media feed $F_2$ may be received by the signature modulator 4. The signature modulator 4 may also receive signature signals $S_1 \ldots S_n$ from signature provider 13. The signature signals $S_1 \ldots S_n$ may be unique identification codes, for example, such that each of the signatures $S_1 \ldots S_4$ may be associated with one of the media feeds $F_1 \ldots F_4$. The association between the individual media feeds $F_1$ to $F_4$ and the individual signatures $S_1$ to $S_4$ may be allocated by, e.g., the signature identifier 11. A second set of correspondences between the signature signals $S_1$ to $S_4$ and the channels $C_1$ to $C_n$ may also be provided (e.g., by the signature modulator 4), thereby forming signature, channel and media feed triplets, as described in relation to FIG. 1. The signature modulator 4 may allocate each of the signature signals $S_1$ to $S_4$, and each media feed received from the media feed selector 2, to one of the channels $C_1$ to $C_n$ which will be transmitted, along with the signatures and media feed content, to the media player 14.

The signature modulator 4 thus receives the media feed $F_2$ from the media feed selector 2, and the signatures $S_1$ to $S_n$ from the signature provider 13, and generates a signal for transmission to the media player 14 by the transmitter 6. In the example embodiment of FIGS. 2 to 4, the transmission may be by means of a radio-frequency signal (e.g., an FM signal), which may include at least two carrier signals at different radio frequencies, each modulated by a signature ($S_1$, $S_2$, etc.) and/or a selected media feed ($F_1$, $F_2$, etc.). The transmission from transmitter 6 to media player 14 may be wireless (7), being received by media player 14 via the aerial (or antenna) 17, and/or may be wired (7'), being received by media player 14 via the wired input connector (e.g., a coax input socket) 21.

While the signature modulator 4 and transmitter 6 of FIGS. 2 to 4 are configured to generate one or more radio-frequency channels $C_1$ to $C_n$, each comprising multiple radio-frequency carrier frequencies (six are illustrated in the figures), this could be any number greater than 1.

In the state illustrated in FIG. 2, the transmitted radio frequency signal by transmitter 6 may comprise multiple carrier frequencies corresponding to channels $C_1$ to $C_n$, each of which may carry a signature signal $S_1$ to $S_n$, except for channel $C_2$, which carries the selected media feed $F_2$. The media player 14 is shown (in FIG. 2) tuned to the frequency of channel $C_2$, and its audio output therefore comprises the content of media feed $F_2$. It may optionally also include signature signal $S_2$.

Audio output of the media player 14 may be via an acoustic signal 10', generated by speaker 16, or via wire 10" from an audio output connector 20. The audio output of the media player 14 may be captured, such as by a microphone (or transducer) 22, and/or may be received via wired connection 10", and fed to the signature identifier 11, which may be configured to detect a signature signal (if any is present) in output (feedback) 10 from the media player 14.

Output 10, 10', 10" of the media player (radio tuner) 14 may be an electrical output, such as an electrical signal 10" from an audio jack socket 20 or a pair of RCA audio sockets, for example, in which case the output (feedback) 10 can be received by the signature identifier 11 by wire. As another alternative, the output signal of the tuner may be converted for transmission to the signature identifier by a different medium, such as an optical (e.g., infra-red, ultraviolet) signal, or a wireless (WLAN, Bluetooth, etc.) connection. In this case a separate device may be required for transmitting the audio output of the media player (radio tuner) 14 to the signature identifier 11.

In the state illustrated in FIG. 2, the media feed selector 2 is shown receiving the media feed $F_2$, which is being fed back from the audio output components 16, 20 of the media player 14. In this stable state, the media feed selector 2 is not required to initiate a change of media feed, and an instruction signal (e.g., via communication link 9) from the signature identifier 11 to the media feed selector 2 is therefore shown as having a null value, Ø.

Alternatively, the corresponding signature signal $S_2$ may be transmitted, in addition to the media feed $F_2$, by transmitter 6 to media player 14, and then fed back via the output 10, 10', 10" to the signature identifier 11 and thence to the media feed selector 2, which may be configured to take no feed-switching action since the selected media feed $F_2$ is the same as the media feed corresponding to the signature signal $S_2$ captured in the audio output of the media player 14.

FIG. 3 illustrates a system state in which the system state shown in FIG. 2 is altered by operating the frequency selection knob 18 and/or selector buttons 19 of the media player (radio tuner) 14, such as to select a different channel (e.g., channel $C_3$ instead of channel $C_2$). Channel $C_3$ may be modulated with a corresponding signature signal, $S_3$, and as such the output 10, 10', 10" may no longer carry media feed $F_2$ but may carry $S_3$ instead. The signature identifier 11 may detects the presence of $S_3$ in the audio output 10, and may send an instruction signal (e.g., via communication link 9) to media feed selector 2 to change the media feed to be transmitted to $F_3$, associated with Channel 3 and signature 3.

FIG. 3 illustrates a system state which is attained once the media feed selector 2 has completed the change to media feed $F_3$. This state may be similar to the state shown in FIG. 2, except that media feed $F_3$ is now being transmitted on channel $C_3$ (rather than transmitting media feed $F_2$ on channel $C_2$).

The signature signals $S_1$, $S_2$, etc. may be acoustic signals, such as in the audible range, or in non-audible range (e.g., in the ultrasonic or infrasonic range). In many instances, especially where the system is configured to select between a modest number of media feeds, each signature signal may need only be a few bits large in order to be able to uniquely identify one of the channels $C_1$, $C_2$, etc. Such a short signature may be analyzed and recognized by the signature identifier within a fraction of a second. This makes it possible to implement the kind of fast channel change (zapping), which the user expects from his experience with FM-tuners.

The signature signals $S_1 \ldots S_n$, which are output by the media player 14, may advantageously be short in duration, especially when the signature signals are in the audible frequency range, so that they are not easily be perceived by the user, and so that they do not spoil his or her listening pleasure.

The signature signals $S_1 \ldots S_n$ may also, for example, be hidden using the masking characteristics of the human ear, or other mechanisms and protocols known to persons skilled in the art. Redundancy can be introduced (e.g., interfering acoustic-codes, two-dimensional 1 Byte Code, or swiping acoustic-codes through the free/unoccupied FM-band), to handle interference (echoes, background noise, long distances, etc.). The signature signals can be transmitted once, or a number of times between channel changes, or repeated continuously and contiguously, or repeated continuously at intervals. The signature signals $S_1 \ldots S_n$ may be pre-allocated to particular channels $C_1 \ldots C_n$. For example, channels which are not being used by radio stations in the vicinity may be chosen. The transmission may be configured to scan the available radio spectrum automatically for suitable frequencies. It may also be configured to generate and allocate a unique carrier identification signature $S_n$ to each of the suitable channel $C_n$.

To reduce the latency of tuning in the IP-radio stream, access to the Internet 25 may be adapted, as illustrated in FIG. 1, such that the streams $F_1$, $F_2$, $F_3$, $F_4$ are not fetched directly from their IP-radio stations over the Internet 25, but rather via the media server 15, in which case the server provider may pre-select a number of audio feeds $F_3$, $F_{560}$, $F_4$, $F_{10}$, $F_2$, $F_{12}$, $F_{50}$, $F_{200}$, $F_1$ and thereby reduce the burden of choice on the user.

Each of the selectable audio feeds $F_1$ to $F_4$ is also allocated to one of the available channels (carrier frequencies) $C_1$ to $C_n$. The allocation can be used by the signature identification 11, the media feed selector 2 and/or the signature modulator 4 for selecting the media feed $F_1$,$F_2$ and for allocating the selected media feed $F_1$,$F_2$ to one of the channels (carrier frequencies) $C_1$, $C_2$.

The system and method described in relation to this first embodiment can be used for example to enable a user to listen to audio content from the different media feeds (e.g., $F_1$ to $F_4$) and to select one of the media feeds using the standard tuning controls 18, 19 of the media player 14. The audio sources or feeds or streams could be any sources of audio content . . . mp3 player, CD player, laptop, Internet radio, local media server, etc. Or the different media feeds could be different iTunes playlists, for example. In this case it would be possible to use a standard radio receiving device to listen to a personal music collection, using the tuning control of the radio receiving device to switch between playlists.

As described above, a radio-frequency signal may be delivered from the transmitter 6 to the receiver 14 by wireless transmission 7, aerial to aerial 17, or it may be delivered over a coaxial cable 7', for example, directly from the transmitter 6 to a coaxial input 21 of the radio receiving device 14. In the latter case, the transmitter 6 can also comprise a radio reception unit (not shown) for receiving locally available radio stations, and the carrier frequencies which are used to transmit the signatures $S_1 \ldots S_n$ and/or the selected audio feed $F_2$ can then be merged with the locally available stations for re-transmission to the receiver 14.

Figure 5:
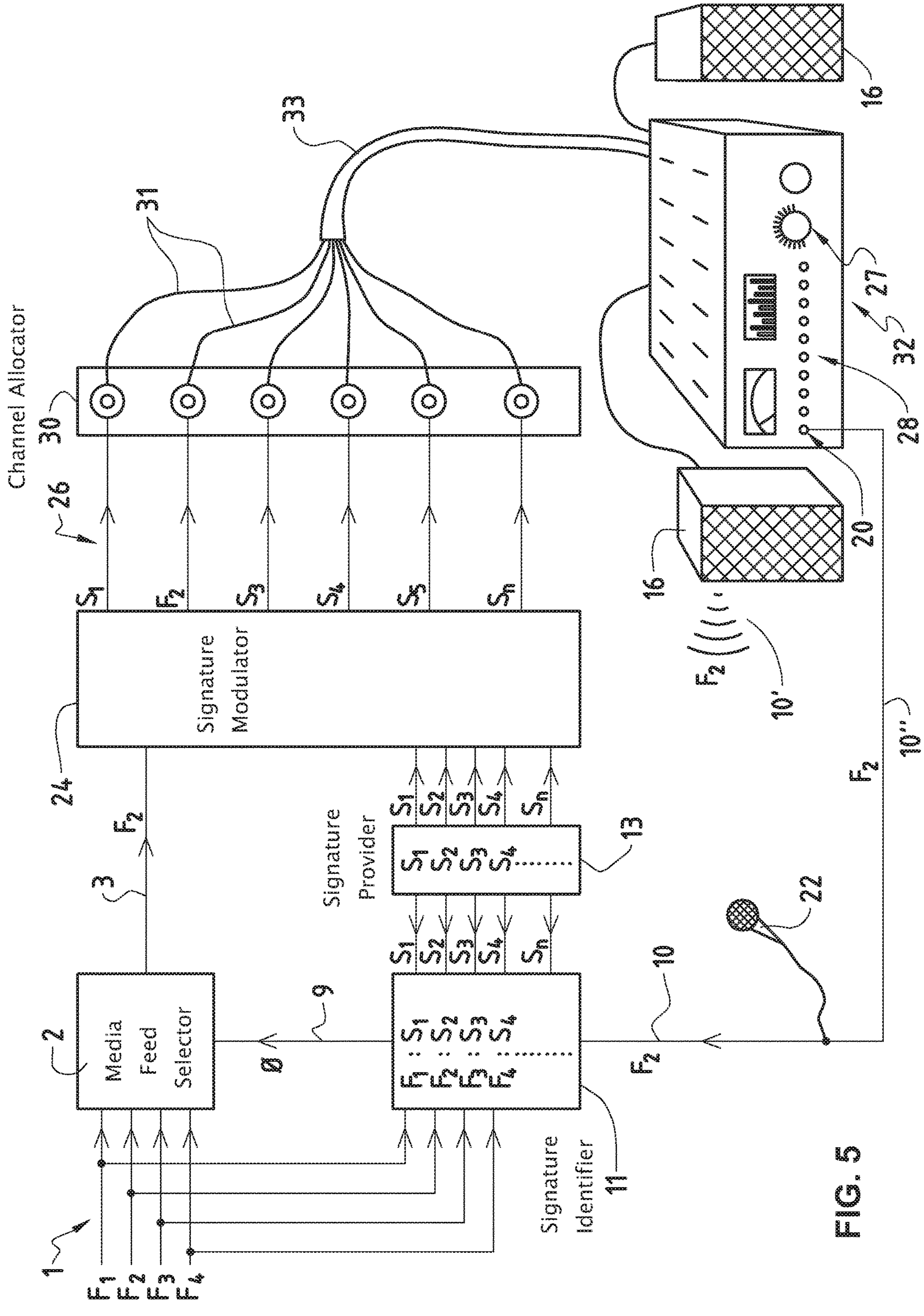
FIG. 5 illustrates in schematic form an example of a second embodiment of a system according to the disclosure.

FIG. 5 illustrates in schematic form an example of a second embodiment of a system according to the invention. In particular, the embodiment depicted in FIG. 5 may comprise a receiver (media player) 32 which may be a different kind of device from that illustrated in FIGS. 2 to 4, particularly requiring no radio-frequency input but operating instead with a base-band signal, for example. The feedback 10 (provided by the media player 32) and the media feed selector 2 as shown in FIG. 5 are similar to those of the first embodiment. Further, as with the example embodiment depicted in FIGS. 2 to 4, the functionality of the controller 90 of FIG. 1 may be implemented via the signature identifier 11 and the signature provider 13.

The functionality of the transmitter 50 of FIG. 1, however, may be comprised in a signature modulator 24 and a channel allocator 30. Each of the signature modulator 24 and the channel allocator 30 may comprise suitable circuitry for implementing various aspects of the present disclosure, including the functions and/or operations attributed thereto with respect to the present embodiment.

In the embodiment depicted in FIG. 5, the media feed ($F_2$ in the system state shown) and the signature signals ($S_1 \ldots S_n$) may be allocated to a plurality of channels 31 without the need for modulating a radio-frequency signal. Rather, the plurality of channels 31 in this case may correspond to, for example, a plurality of physical connections (e.g., an individual connection per channel), such as within a connection 33 to the media player 32. The connection 33 between the signature modulator 24 and the media player 32 may be, for example, a multi-way cable, connected to a plurality of input connectors of the media player 32 (e.g., separate inputs for Tape Playback, CD, DVD, MP3-player, Mic, Aux, SCART, USB interfaces, etc.).

The media player 32 (and/or a remote control, not shown, used in conjunction therewith) may have selection means—e.g., selector controls 27, 28, which may be used to select which input should be active. The signal on the selected active input (either a media feed or a signature signal, for example) may be then played through one or more speakers 16 and/or through a jack output 20. Any signature signal $S_1$, $S_2$, etc. detected in the audio output is then used to determine which of the available media feeds $F_1$, $F_2$, etc. should be selected by media feed selector 2.

As with the embodiment depicted in FIGS. 2 to 4, the audio feedback from the media player 32 to the signature identifier 11 in the embodiment shown in FIG. 5 may comprise an acoustic communication 10' (e.g., outputted via the speaker(s) 16, and captured via microphone 22), and a wired connection 10" (e.g., outputted via the jack output 20). Nonetheless, it should be understood that these are alternatives, and that it is not required that they both be present.

While the example embodiments described above with reference to the figures (FIGS. 1 to 5) are illustrated as supplying a single audio feed (e.g., from the media feed selector 2 to the signature modulator 4), the disclosure is not so limited. In this regard, providing a single audio feed may be of a particular benefit where the bandwidth is to be kept to a minimum, since it allows the system to offer the user a wide choice of media feeds, while only receiving one media feed at a time. Nonetheless, in some instances it may be advantageous to have more than one media feed active and selected by the media feed selector 2, and as such in some example embodiments more than single media feed may be provided at the same time.

For example, in the case of IP audio streaming, some or all of the desired media feeds can be received in low "preview" quality and transmitted (with the signature signals) by the signature modulator 4, so that the user has more information on which to base his choice of media feed. This helps the user to zap quickly through the channels while getting an immediate "preview" of each radio stations. Then, if a channel remains selected for a certain length of time, the media feed selector 2 can be instructed to retrieve the selected channel in a higher quality, more bandwidth-consuming version. Further, in some arrangements, bandwidth may be less critical, such as media content received by satellite, or by cable, or from local devices, and as such the system could be configured so that most or even all of the channels $C_1 \ldots C_n$ carry media feeds. In this case, the signature signals $S_1 \ldots S_n$ can be merged with the media feeds, and the signature identifier 11 can be configured to differentiate the carrier signature from the media content.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed is:

1. A system, comprising:

one or more circuits configurable for handling a plurality of media feeds, wherein the one or more circuits are configured to:

select, based on a feedback signal corresponding to an output signal of a media player, a media feed from the plurality of media feeds; and configure a transmit signal for transmittal to the media player, wherein the transmit signal comprises a plurality of channels, and wherein, to configure the transmit signal, the one or more circuits are configured to:

identify a signature, from a plurality of unique signatures, based on the feedback signal, wherein the signature is associated with the selected media feed;

select one channel from the plurality of channels based on the identified signature;

convey the selected media feed over the selected one channel; and convey a different one of the plurality of unique signatures over a remaining one or each of remaining ones of the plurality of channels.

2. The system of claim 1, wherein the output signal comprises a video output signal or an audio output signal.

3. The system of claim 1, wherein the media player comprises at least one channel selection control component, wherein the media player comprises a radio receiver, and wherein the channel selection control component comprises a radio-frequency selector for selecting a radio-frequency for the radio receiver.

4. The system of claim 1, wherein the media player comprises at least one channel selection control component, wherein the channel selection control component comprises an input connection selector for selecting, from a plurality of input connections of the media player, an input connection for playback.

5. The system of claim 1, wherein the media player is configured to provide the output signal to the one or more circuits via a wired connection.

6. The system of claim 1, wherein the output signal comprises an audio output signal, and wherein the system further comprises a microphone configured to capture the audio output signal of the media player, wherein the captured audio output signal is provided to the one or more circuits.

7. The system of claim 1, wherein the one or more circuits are configured to:

process the feedback signal; and determine based on the processing of the feedback signal, control information for controlling one or both of:

selection of the media feed from the plurality of media feeds; and configuration of the transmit signal.

8. The system of claim 1, wherein the one or more circuits are configured to, when configuring the transmit signal, process the selected one channel to carry the selected media feed over the selected one channel.

9. The system of claim 1, wherein the one or more circuits are configured to, when configuring the transmit signal, frequency-modulate the selected media feed onto the selected one channel.

10. A method, comprising:

selecting, based on a feedback signal corresponding to an output signal of a media player, a media feed from a plurality of media feeds; and configuring a transmit signal for transmittal to the media player, wherein the transmit signal comprises a plurality of channels, and wherein configuring the transmit signal, the one or more circuits are configuring:

identifying, from a plurality of unique signatures, a signal based on the feedback signal and associated with the selected media feed;

selecting one channel from the plurality of channels based on the identified signature;

conveying the selected media feed over the selected one channel; and conveying a different one of the plurality of unique signatures over a remaining one or each of remaining ones of the plurality of channels.

11. The method of claim 10, wherein the output signal comprises a video output signal or an audio output signal.

12. The method of claim 10, further comprising configuring the transmit signal for transmittal to the media player via a wireless connection.

13. The method of claim 10, wherein the media player comprises a radio receiver configured for playback based on the transmit signal.

14. The method of claim 10, further comprising receiving the output signal from the media player via a wired connection.

15. The method of claim 10, wherein the output signal comprises an audio output signal, and wherein the method further comprises capturing the audio output signal of the media player via a microphone.

16. The method of claim 10, further comprising:

processing the feedback signal; and determining based on the processing of the feedback signal, control information for controlling one or both of:

selecting of the media feed from the plurality of media feeds; and configuring of the transmit signal.

17. The method of claim 10, wherein configuring the transmit signal comprises processing the selected one channel to carry the selected media feed over the selected one channel.

18. The method of claim 10, wherein configuring the transmit signal comprises frequency-modulating the selected media feed onto the selected one channel.

* * * * *